United States Patent
Gan et al.

(10) Patent No.: US 11,546,846 B2
(45) Date of Patent: Jan. 3, 2023

(54) STATE SWITCHING METHOD AND APPARATUS

(71) Applicant: HUAWEI TECHNOLOGIES CO., LTD., Shenzhen (CN)

(72) Inventors: Ming Gan, Shenzhen (CN); Meilu Lin, Shenzhen (CN); Jia Jia, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 17/115,661

(22) Filed: Dec. 8, 2020

(65) Prior Publication Data

US 2021/0168713 A1    Jun. 3, 2021

Related U.S. Application Data

(63) Continuation of application No. 16/368,903, filed on Mar. 29, 2019, now Pat. No. 10,924,996, which is a (Continued)

(30) Foreign Application Priority Data

Sep. 30, 2016    (CN) .......................... 201610877476.2

(51) Int. Cl.
*H04W 52/02*    (2009.01)
*H04W 52/18*    (2009.01)

(52) U.S. Cl.
CPC ....... *H04W 52/0216* (2013.01); *H04W 52/02* (2013.01); *H04W 52/028* (2013.01);
(Continued)

(58) Field of Classification Search
CPC ......... H04W 52/0216; H04W 52/0229; H04W 52/028; H04W 52/02; H04W 52/18
See application file for complete search history.

(56) References Cited

U.S. PATENT DOCUMENTS 8,982,774 B2    3/2015  Kamath et al.
9,781,670 B2 *  10/2017  Seok ................. H04W 52/0225
(Continued)

FOREIGN PATENT DOCUMENTS

CN    1684441 A    10/2005
CN    101867942 A    10/2010
(Continued)

OTHER PUBLICATIONS

Chinese Notice issued in Chinese Application No. 201610877476.2 dated Jun. 23, 2021 (four pages).

*Primary Examiner* — Jael M Ulysse

(57) ABSTRACT

Embodiments of the present invention disclose a state switching method and apparatus. The state switching method includes: receiving, by a first network node, a preset frame sent by a second network node, where the preset frame includes indication information used to indicate an on/off state of a main transceiver and/or a wake up receiver of the first network node immediately, after a specified time point, or within a specified time period; and controlling, by the first network node based on the indication information, to switch an on/off state of the main transceiver and/or the wake up receiver of the first network node. According to the embodiments of the present invention, energy is saved by using a preset frame to indicate an on/off state of a main transceiver and/or a wake up receiver of a network node after a specified time point or within a specified time period.

19 Claims, 8 Drawing Sheets

Related U.S. Application Data continuation of application No. PCT/CN2017/103809, filed on Sep. 27, 2017.

(52) U.S. Cl.
CPC ... *H04W 52/0229* (2013.01); *H04W 52/0235* (2013.01); *H04W 52/18* (2013.01); *Y02D 30/70* (2020.08)

(56) References Cited

U.S. PATENT DOCUMENTS

| | | | | |
|---|---|---|---|---|
| 9,983,662 | B2* | 5/2018 | Chang | G06F 3/00 |
| 10,924,996 | B2* | 2/2021 | Gan | H04W 52/18 |
| 2004/0127265 | A1* | 7/2004 | Van Bosch | H04W 52/0216 455/574 |
| 2004/0253996 | A1* | 12/2004 | Chen | H04W 52/0216 455/574 |
| 2005/0250528 | A1* | 11/2005 | Song | H04W 52/325 455/522 |
| 2008/0025279 | A1* | 1/2008 | Young | H04W 52/0216 370/341 |
| 2010/0150042 | A1* | 6/2010 | Oh | H04W 52/0235 370/311 |
| 2012/0171954 | A1* | 7/2012 | Rudland | H04W 52/0225 455/41.1 |
| 2012/0250537 | A1* | 10/2012 | Shatil | H04W 52/0229 370/252 |
| 2012/0320809 | A1* | 12/2012 | Sturm | H04W 52/0235 370/311 |
| 2014/0112229 | A1* | 4/2014 | Merlin | H04L 5/0055 370/311 |
| 2015/0036576 | A1* | 2/2015 | Jafarian | H04W 52/0212 370/311 |
| 2015/0208349 | A1* | 7/2015 | Ramamurthy | H04W 52/0212 370/311 |
| 2015/0327174 | A1 | 11/2015 | Rajagopal et al. | |
| 2015/0365905 | A1 | 12/2015 | Xue | |
| 2016/0127995 | A1 | 5/2016 | Merlin et al. | |
| 2016/0128128 | A1 | 5/2016 | Lokang et al. | |
| 2016/0212703 | A1* | 7/2016 | Seok | H04L 1/1685 |
| 2016/0248533 | A1* | 8/2016 | Li | H04J 11/0076 |
| 2017/0127352 | A1* | 5/2017 | Park | H04W 52/0216 |

FOREIGN PATENT DOCUMENTS

| | | |
|---|---|---|
| CN | 102076067 A | 5/2011 |
| CN | 103314620 A | 9/2013 |
| CN | 103974401 A | 8/2014 |
| CN | 107787029 A | 3/2018 |
| JP | 2015532571 A | 11/2015 |

* cited by examiner

STATE SWITCHING METHOD AND APPARATUS

CROSS-REFERENCE TO RELATED APPLICATIONS

This application is a continuation of U.S. patent application Ser. No. 16/368,903, filed on Mar. 29, 2019, which is a continuation of International Application No. PCT/CN2017/103809, filed on Sep. 27, 2017. The International Application claims priority to Chinese Patent Application No. 201610877476.2, filed on Sep. 30, 2016. All of the aforementioned patent applications are hereby incorporated by reference in their entireties.

TECHNICAL FIELD

The present invention relates to the field of wireless network technologies, and in particular, to a state switching method and apparatus.

BACKGROUND

In a Wireless Fidelity (Wi-Fi) network, a device wastes a considerable part of energy on listening during which no signal is received (idle listening). Related solutions in the current legacy 802.11 protocol (802.11 b/a/g/n/ac, and the like) focus on optimizing a device sleep policy. In addition to optimizing the sleep policy, another technical approach to reduce device energy waste during idle listening is to use a low power wake up receiver (Low Power Wake Up Receiver, LP-WUR) (WUR for short herein). A core idea of the technical approach is that a receive end device (for example, a STA) includes a newly added low power wake up receiver (WUR) in addition to a legacy 802.11 transceiver end (802.11 main radio, an 802.11 main transceiver module, or a Wi-Fi main transceiver module). As shown in FIG. 3, after the 802.11 main transceiver module is in a deep sleep state, the low power WUR wakes up and starts operating. If another device (for example, an AP on the left in the figure) needs to communicate with a device (for example, a STA on the right in the figure) that has the WUR and the 802.11 main transceiver module, the AP first sends a WUR wake up packet (Wake Up Packet, WUP) to the WUR. After correctly receiving the WUP sent to the WUR, the WUR wakes up the 802.11 main transceiver module of the STA, and the AP communicates with the woken-up 802.11 main transceiver module.

In this technology, the low power WUR is used instead of the 802.11 main transceiver module to listen on a channel when a medium is idle (it is expected that consumption in a WUR listening/receiving status is about 0.1-1% of the 802.11 main transceiver module herein, in other words, less than 100 µW), so that device energy waste during idle listening can be efficiently reduced. However, in the prior art, a manner of controlling an on/off state of a wake up receiver and a main transceiver is not standardized.

SUMMARY

Embodiments of the present invention provide a state switching method and apparatus, so that energy is saved by using a preset frame to indicate an on/off state of a main transceiver and/or a wake up receiver of a network node after a specified time point or within a specified time period.

According to a first aspect, an embodiment of the present invention provides a state switching method. The method is performed by a first network node, and the first network node implements interaction with a second network node. Optionally, the first network node receives a preset frame sent by the second network node, where the preset frame includes indication information used to indicate an on/off state of a main transceiver and/or a wake up receiver of the first network node immediately, after a specified time point, or within a specified time period; and the first network node controls, based on the indication information, to switch an on/off state of the main transceiver and/or the wake up receiver of the first network node.

In a possible design, the preset frame includes an 802.11 frame or a wake up packet, the main transceiver of the first network node receives the 802.11 frame, and the wake up receiver of the first network node receives the wake up packet.

In another possible design, if the indication information is used to indicate the on/off states of the main transceiver of the first network node and the wake up receiver of the first network node immediately, after a specified time point, or within a specified time period, that the first network node controls, based on the indication information, to switch an on/off state of the main transceiver and/or the wake up receiver of the first network node includes:

controlling, by the first network node based on the indication information, to switch an on/off state of at least one of the main transceiver and the wake up receiver.

In another possible design, if the indication information is used to indicate an off state of the wake up receiver of the first network node immediately, after a specified time point, or within a specified time period, that the first network node controls, based on the indication information, to switch an on/off state of the main transceiver and/or the wake up receiver of the first network node includes:

turning off, by the first network node, the wake up receiver immediately, after the specified time point, or within the specified time period based on the indication information.

In another possible design, if the preset frame is the wake up packet, and the indication information is used to indicate an on state of the main transceiver of the first network node immediately, after a specified time point, or within a specified time period, that the first network node controls, based on the indication information, to switch an on/off state of the main transceiver and/or the wake up receiver of the first network node includes:

turning on, by the first network node, the main transceiver immediately, after the specified time point, or within the specified time period based on the indication information to perform data communication; and controlling, by the first network node, to turn off the wake up receiver when a data communication status of the main transceiver meets a preset condition.

In another possible design, if the preset frame is the 802.11 frame, and the indication information includes an identifier used to indicate that the second network node has no buffer data to be sent to the first network node, that the first network node controls, based on the indication information, to switch an on/off state of the main transceiver and/or the wake up receiver of the first network node includes:

controlling, by the first network node based on the indication information, to turn off the main transceiver of the first network node and turn on the wake up receiver of the first network node.

According to a second aspect, an embodiment of the present invention provides a state switching method. The method is performed by a network node, and the network node may be an access point AP or a station STA. Optionally, the network node generates a preset frame when an on/off state of a main transceiver and/or a wake up receiver of the network node needs to be reported, where the preset frame includes an on/off state of the main transceiver and/or the wake up receiver of the network node immediately, after a specified time point, or within a specified time period; and the network node sends the preset frame.

In a possible design, the preset frame includes an 802.11 frame. The main transceiver of the network node sends the 802.11 frame.

In another possible design, the generating a preset frame when an on/off state of a main transceiver and/or a wake up receiver of the network node needs to be reported includes:

generating the preset frame when the network node needs to switch the on/off state of the main transceiver and/or the wake up receiver; or generating the preset frame when the network node receives a request frame used to request the on/off state of the main transceiver and/or the wake up receiver of the network node.

According to a third aspect, an embodiment of the present invention provides a radio control method. The method is performed by a second network node, and the second network node implements interaction with a first network node. Optionally, a transmission distance of Wake up Radio and a transmission distance of main transceiver radio of the second network node are obtained, where the transmission distance of the Wake up Radio is a farthest distance that can be reached by a wake up packet sent by the second network node to the first network node. If the transmission distance of the Wake up Radio is less than the transmission distance of the main transceiver radio, disabling of the wake up receiver of the first network node is controlled, or adjustment of transmit power of the Wake up Radio of the second network node is controlled; or the main transceiver of the second network node is controlled to operate in a first preset band, and the wake up receiver of the second network node is controlled to operate in a second preset band.

In a possible design, the obtaining a transmission distance of Wake up Radio and a transmission distance of main transceiver radio of the second network node includes:

obtaining an operating band of the wake up receiver of the first network node and maximum transmit power of a main transceiver of the first network node; and calculating the transmission distance of the Wake up Radio and the transmission distance of the main transceiver radio of the second network node based on the operating band of the wake up receiver of the first network node, the maximum transmit power of the main transceiver of the first network node, maximum power of a wake up transmitter of the second network node, maximum transmit power of the main transceiver of the second network node, and an operating band of the main transceiver of the second network node.

According to a fourth aspect, an embodiment of the present invention provides a state switching apparatus, applied to a first network node. The state switching apparatus includes a transceiver unit and a processing unit. The transceiver unit is configured to receive a preset frame sent by a second network node, and the preset frame includes indication information used to indicate an on/off state of a main transceiver and/or a wake up receiver of the first network node immediately, after a specified time point, or within a specified time period. The processing unit is configured to control, based on the indication information, to switch an on/off state of the main transceiver and/or the wake up receiver of the first network node.

According to a fifth aspect, an embodiment of the present invention provides a state switching apparatus, applied to a network node. The network node may be an access point AP or a station STA. The state switching apparatus includes a processing unit and a transceiver unit. The processing unit is configured to generate a preset frame when needing to report an on/off state of a main transceiver and/or a wake up receiver of the network node, where the preset frame includes an on/off state of the main transceiver and/or the wake up receiver of the network node immediately, after a specified time point, or within a specified time period. The transceiver unit is configured to send the preset frame.

According to a sixth aspect, an embodiment of the present invention provides a radio control apparatus, applied to a second network node. The radio control apparatus includes an obtaining unit and a processing unit. The obtaining unit is configured to obtain a transmission distance of Wake up Radio and a transmission distance of main transceiver radio of the second network node, where the transmission distance of the Wake up Radio is a farthest distance that can be reached by a wake up packet sent by the second network node to a first network node. The processing unit is configured to: if the transmission distance of the Wake up Radio is less than the transmission distance of the main transceiver radio, control to disable a wake up receiver of the first network node, or control to adjust transmit power of the Wake up Radio of the second network node; or control a main transceiver of the second network node to operate in a first preset band, and control a wake up receiver of the second network node to operate in a second preset band.

According to a seventh aspect, an embodiment of the present invention provides a state switching apparatus, applied to a first network node. The state switching apparatus includes: a memory, configured to store computer executable program code; a transceiver; and a processor coupled to the memory and the transceiver.

The program code includes an instruction, and when the processor executes the instruction, the instruction enables the state switching apparatus to perform the following operations: receiving a preset frame sent by a second network node, where the preset frame includes indication information used to indicate an on/off state of a main transceiver and/or a wake up receiver of the first network node immediately, after a specified time point, or within a specified time period; and controlling, based on the indication information, to switch an on/off state of the main transceiver and/or the wake up receiver of the first network node.

According to an eighth aspect, an embodiment of the present invention provides a state switching apparatus, applied to a network node. The state switching apparatus includes: a memory, configured to store computer executable program code; a transceiver; and a processor coupled to the memory and the transceiver.

The program code includes an instruction, and when the processor executes the instruction, the instruction enables the state switching apparatus to perform the following operations: generating a preset frame when an on/off state of a main transceiver and/or a wake up receiver of the network node needs to be reported, where the preset frame includes an on/off state of the main transceiver and/or the wake up receiver of the network node immediately, after a specified time point, or within a specified time period; and sending the preset frame.

According to a ninth aspect, an embodiment of the present invention provides a radio control apparatus, applied to a second network node. The radio control apparatus includes: a memory, configured to store computer executable program code; a transceiver; and a processor coupled to the memory and the transceiver.

The program code includes an instruction, and when the processor executes the instruction, the instruction enables the radio control apparatus to perform the following operations: obtaining a transmission distance of Wake up Radio and a transmission distance of main transceiver radio of the second network node, where the transmission distance of the Wake up Radio is a farthest distance that can be reached by a wake up packet sent by the second network node to a first network node; and if the transmission distance of the Wake up Radio is less than the transmission distance of the main transceiver radio, controlling to disable a wake up receiver of the first network node, or controlling to adjust transmit power of the Wake up Radio of the second network node; or controlling a main transceiver of the second network node to operate in a first preset band, and controlling a wake up receiver of the second network node to operate in a second preset band.

According to a tenth aspect, an embodiment of the present invention provides a computer storage medium, configured to store a computer software instruction used by the state switching apparatus in the fourth aspect. The computer software instruction includes a program that is designed for executing the first aspect.

According to an eleventh aspect, an embodiment of the present invention provides a computer storage medium, configured to store a computer software instruction used by the state switching apparatus in the fifth aspect. The computer software instruction includes a program that is designed for executing the second aspect.

According to a twelfth aspect, an embodiment of the present invention provides a computer storage medium, configured to store a computer software instruction used by the radio control apparatus in the sixth aspect. The computer software instruction includes a program that is designed for executing the third aspect.

In the embodiments of the present invention, the first network node receives the preset frame sent by the second network node. The preset frame includes the indication information used to indicate the on/off state of the main transceiver and/or the wake up receiver of the first network node immediately, after a specified time point, or within a specified time period. The first network node controls, based on the indication information, to switch the on/off state of the main transceiver and/or the wake up receiver of the first network node. Energy is saved by using the indication information in the preset frame to indicate the on/off state of the main transceiver and/or the wake up receiver of the first network node immediately, after a specified time point, or within a specified time period.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

The embodiments of the present invention may be applied to a wireless local area network (WLAN). Currently, the WLAN uses the IEEE (Institute of Electrical and Electronics Engineers) 802.11 series standards. The WLAN may include a plurality of basic service sets BSSs, network nodes in the basic service set are stations, and the stations include access point AP) stations and non-access point stations (Non-AP STA). Each basic service set may include one AP and a plurality of non-AP STAs associated with the AP.

The access point station is also referred to as a wireless access point, a hotspot, or the like. The AP is an access point used by a mobile user to access a wired network. The AP is mainly deployed in a house, inside a building, and inside a park. A typical coverage radius is tens of meters to hundreds of meters. Certainly, the AP may also be deployed outdoors.

The AP is equivalent to a bridge that connects a wired network and a wireless network. A major function of the AP is to connect various wireless network clients and connect the wireless network to Ethernet. Specifically, the AP may be a terminal device or a network device with a Wi-Fi chip. Optionally, the AP may be a device that supports the 802.11ax standard. Further, optionally, the AP may be a device that supports a plurality of WLAN standards, such as 802.11ac, 802.11n, 802.11g, 802.11b, and 802.11a.

The non-access point station (Non-AP STA) may be a wireless communications chip, a wireless sensor, or a wireless communications terminal, for example, a mobile telephone that supports a Wi-Fi communication function, a tablet computer that supports a Wi-Fi communication function, a set top box that supports a Wi-Fi communication function, a smart TV that supports a Wi-Fi communication function, an intelligent wearable device that supports a Wi-Fi communication function, a vehicular communications device that supports a Wi-Fi communication function, or a computer that supports a Wi-Fi communication function. Optionally, the STA may support the 802.11ax standard. Further, optionally, the station supports a plurality of WLAN standards, such as 802.11ac, 802.11n, 802.11g, 802.11b, and 802.11a.

With evolution of a wireless local area network WLAN standard, the IEEE 802.11 task group is preparing 802.11 standard research and formulation work that uses a low power wake up receiver (LP-WUR) as a core technology to reduce power consumption. An SG (Study Group, study group) of the 802.11 standard has been established in IEEE in June 2016, and it is expected to establish a Task Group (TG) by the end of 2016. The project is referred to as a WUR for short.

Figure 2:
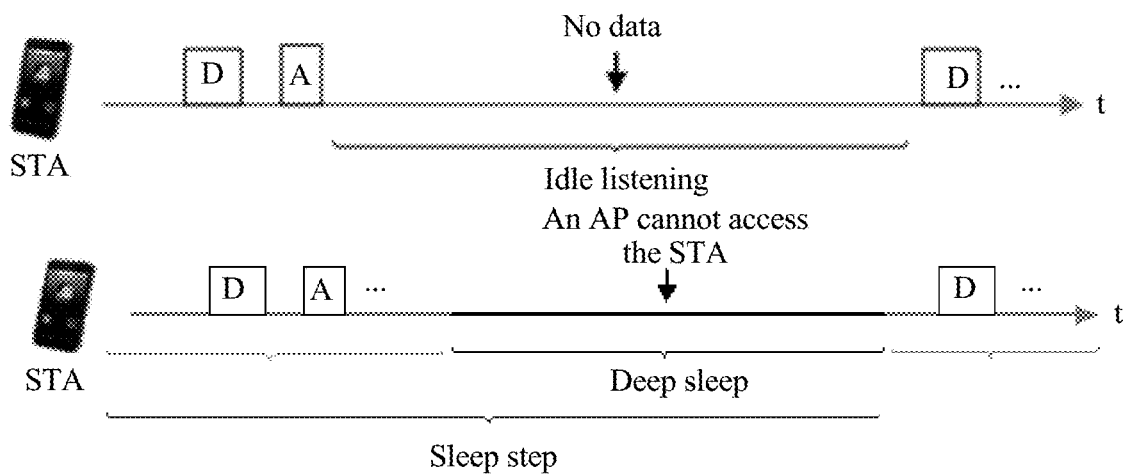
FIG. 2 is a schematic diagram of conventional signal listening and a sleep policy according to an embodiment of the present invention.

In a Wi-Fi network, a device wastes a considerable part of energy on listening during which no signal is received (idle listening). Related solutions in the current legacy 802.11 protocol (802.11 b/a/g/n/ac, and the like) focus on optimizing a device sleep policy. As shown in a first timeline in FIG. 2, when a device (for example, a workstation, a STA, or a station) has no message for receiving and sending (for example, in a No data phase), if a channel is continuously listened (in other words, idle listening), considerable energy may be consumed. Therefore, a sleep schedule (Sleep Schedule) is introduced into a second timeline in FIG. 2, so that the STA can be in a deep sleep state when no data is received or sent, thereby reducing energy consumption during persistent idle listening. However, when the STA is in a deep sleep state, the AP cannot communicate with the STA, and transmission can be performed between the STA and the AP only after the STA wakes up. This may cause a latency. To avoid a high latency caused by the sleep schedule, the STA usually wakes up frequently, according to a sleep policy, to check whether the STA needs to receive data. However, this reduces sleep efficiency of the STA (the STA wakes up frequently, but no useful data needs to be received and sent, and more energy is consumed compared with sleep for a long time).

Figure 3:
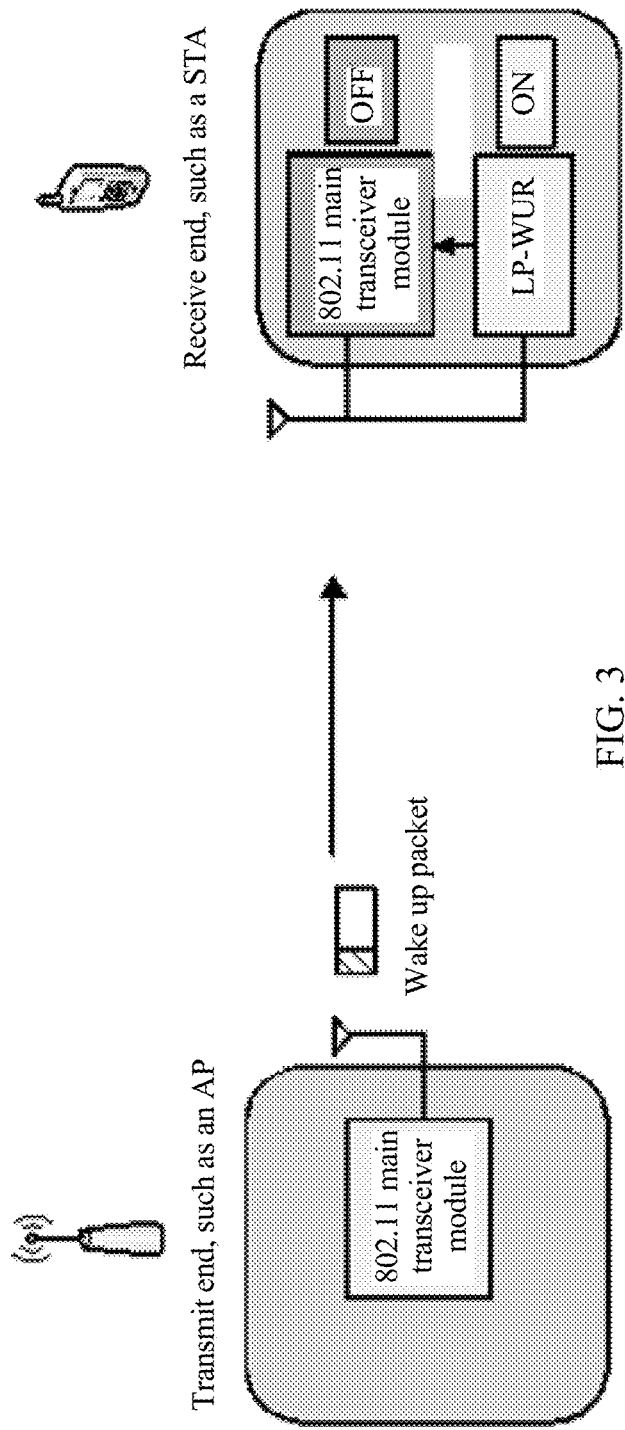
FIG. 3 is a possible schematic structural diagram of a low power receiver according to an embodiment of the present invention.

In addition to optimizing the sleep policy, another technical approach to reduce device energy waste during idle listening is to use the LP-WUR. A core idea of the technical approach is that a receive end device (for example, a STA) includes a newly added low power wake up receiver in addition to a legacy 802.11 transceiver end (802.11 main radio, an 802.11 main transceiver module, or a Wi-Fi main transceiver module). As shown in FIG. 3, after the 802.11 main transceiver module is in a deep sleep state, the low power WUR wakes up and starts operating. If another device (for example, an AP on the left in the figure) needs to communicate with a device (for example, a STA on the right in the figure) that has the WUR and the 802.11 main transceiver module, the AP first sends a WUR wake up packet (WUP) to the WUR. After correctly receiving the WUP sent to the WUR, the WUR wakes up the 802.11 main transceiver module of the STA, and then the WUR goes to sleep. In this case, the AP communicates with the woken-up 802.11 main transceiver module. After completing communication with the AP, the 802.11 main transceiver module goes to sleep. At the same time, the WUR wakes up again, to listen to whether there is a WUP sent to the WUR, so as to wake up the 802.11 main transceiver module.

In this technology, the low power WUR is used instead of the 802.11 main transceiver module to listen on a channel when a medium is idle (it is expected that consumption in a WUR listening/receiving status is about 0.1-1% of the 802.11 main transceiver module herein, in other words, less than 100 µW), so that device energy waste during idle listening can be efficiently reduced.

To implement low power consumption, a relatively simple and less complex circuit structure, frame structure design (for example, the WUP), and the like of the WUR are required. For example, the WUR circuit structure may include only an energy detection part and a radio frequency (RF) part, and therefore some complex modulation manners cannot be demodulated. Therefore, the WUP may use a simple binary on-off keying (OOK) modulation manner or frequency shift keying (FSK).

Figure 4A:
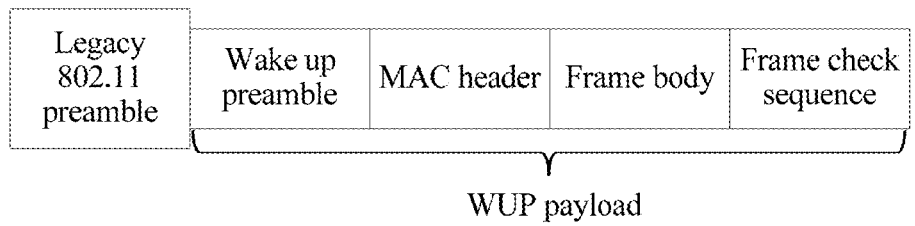
FIG. 4a shows a possible frame structure of a wake up packet according to an embodiment of the present invention.

A possible WUP frame structure is shown in FIG. 4a. A former part is a legacy 802.11 preamble, may be understood by another peripheral 802.11 device (a peripheral 802.11 device detects, by listening, that the preamble may not preempt a channel in a period of time), and is used to protect a subsequent part of the wake up packet from interference by the legacy 802.11 device. A subsequent part is a payload of the WUP, and uses the OOK modulation. Only the WUR can understand the payload. The part may include a wake-up preamble (Wake-Up Preamble, used to identify a WUP signal), a MAC header (including a WUR ID, used to distinguish different WURs), a frame body (a frame body, which can carry some other information), and an frame check sequence (FCS, used to ensure that received data is the same as data sent). The WUR ID information herein may be a partial or complete station association identifier, or a WUR identifier assigned by the AP to the station, or a receiving MAC address or a partial receiving MAC address of the station, or other information that may be used to distinguish between WURs of different stations. In addition, the payload part of the WUR may be narrowband transmitted, to be specific, different from the legacy 802.11 preamble that is transmitted based on a basic unit with a 20 M bandwidth, for example, the narrowband may be 1 M, 2 M, 4 M, 8 M, or 16 M, or 5 M, 10 M, or 20 M.

Figure 4B:
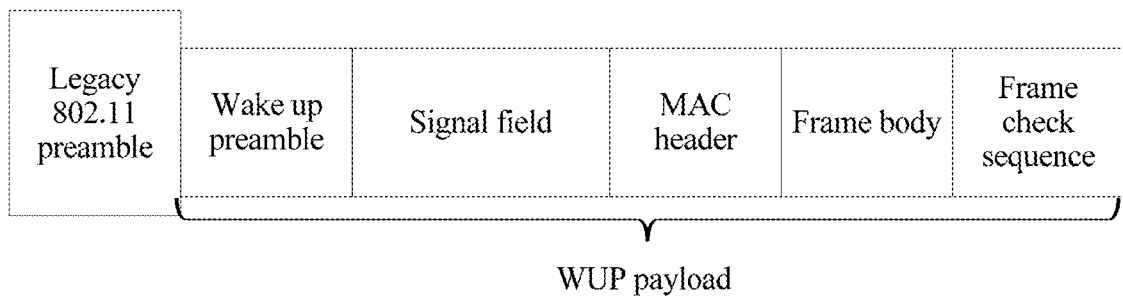
FIG. 4b shows a possible frame structure of another wake up packet according to an embodiment of the present invention.

FIG. 4b shows another possible WUP frame structure. The WUP frame structure includes a legacy 802.11 preamble, a wake-up preamble, a signaling field (used to carry some physical layer signaling, for example, an AP identifier, a WUR ID, and a modulation and coding indication), a MAC header, a frame body, and a frame check sequence.

A network node in the embodiments of the present invention is an AP or a STA. If a first network node is an AP, a second network node is a STA. If a first network node is a STA, a second network node is an AP. It should be noted that both the first network node and the second network node may be STAs.

The first network node in the embodiments of the present invention is equipped with a wake up receiver and a main transceiver. Generally, the second network node sends a wake up packet to the wake up receiver of the first network node, so that the wake up receiver wakes up the main transceiver of the first network node. Then, the main transceiver sends an acknowledgment frame or a PS-Poll frame to the second network node to notify the second network node that the main transceiver of the first network node has woken up, and then may receive data sent by the second network node. Alternatively, the first network node directly sends data to a main transceiver of the second network node after specific time.

In the present invention, for further saving energy, the second network node may send a preset frame to the first network node, so as to inform an on/off state of the main transceiver and/or the wake up receiver of the first network node immediately, after a specified time point, or within a specified time period.

Figure 1:
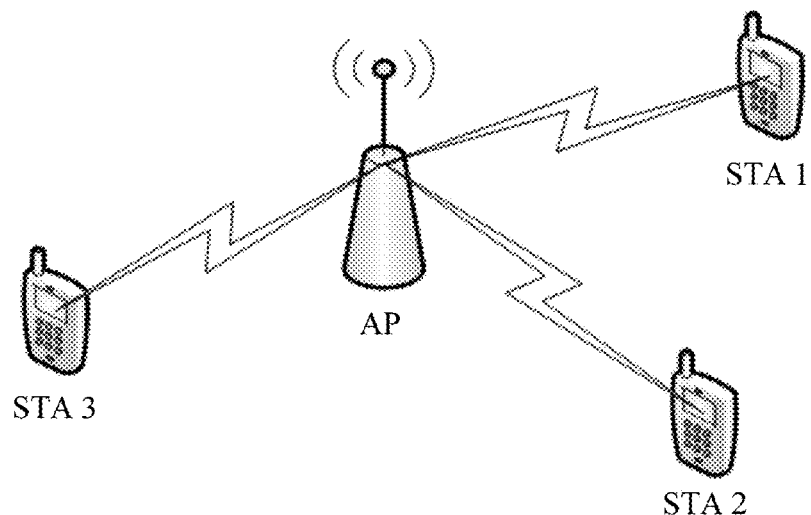
FIG. 1 is a schematic diagram of an application scenario according to an embodiment of the present invention.

FIG. 1 is a schematic system diagram of a typical WLAN deployment scenario. One AP and three STAs associated with the AP are included. The AP may separately communicate with a STA 1, a STA 2, and a STA 3. The first network node in this embodiment of the present invention may be the AP in FIG. 1, or may be the STA in FIG. 1.

It should be noted that the first network node may include the structure shown in FIG. 3, in other words, include both an 802.11 main transceiver module and an LP-WUR module. The LP-WUR module is configured to: receive a wake up packet sent by the AP, and wake up the 802.11 main transceiver module.

In this embodiment of the present invention, an example in which the first network node is a STA and the second network node is an AP is used for description. Certainly, this does not constitute a limitation on the present invention. The AP sends a preset frame to a station STA associated with the AP, for example, sends the preset frame to any one or more STAs in the STA 1, the STA 2, and the STA 3 in FIG. 1. The wake up packet includes indication information used to indicate an on/off state of a wake up receiver and/or a main transceiver of the STA immediately, after a specified time point, or within a specified time period. The STA adjusts an on/off state of the wake up receiver and/or the main transceiver based on the indication information.

With reference to FIG. 5 to FIG. 10, a state switching method provided in an embodiment of the present invention is described below.

Figure 5:
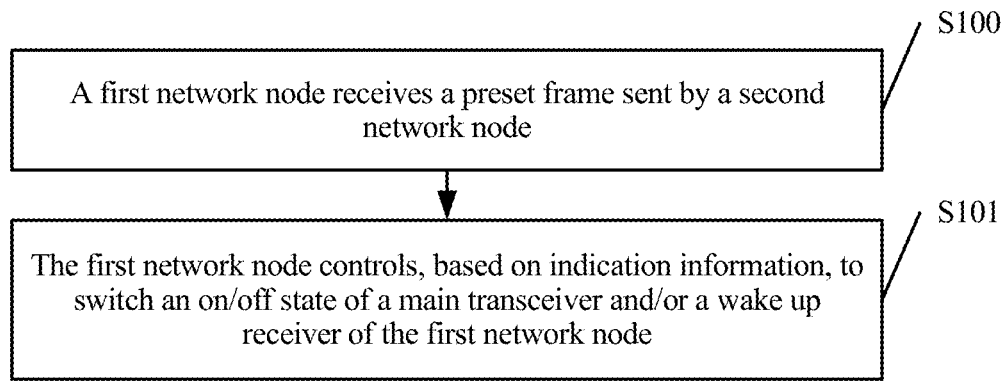
FIG. 5 is a schematic flowchart of a state switching method according to an embodiment of the present invention.

FIG. 5 is a schematic flowchart of a state switching method according to an embodiment of the present invention. As shown in the figure, the state switching method in this embodiment of the present invention includes steps S100 and S101.

S100. A first network node receives a preset frame sent by a second network node, where the preset frame includes indication information used to indicate an on/off state of a main transceiver and/or a wake up receiver of the first network node immediately, after a specified time point, or within a specified time period.

S101. The first network node controls, based on the indication information, to switch an on/off state of the main transceiver and/or the wake up receiver of the first network node.

Optionally, the preset frame includes an 802.11 frame or a wake up packet, the main transceiver of the first network node receives the 802.11 frame, and the wake up receiver of the first network node receives the wake up packet.

Specifically, in an implementation, if the preset frame carries a bit to instruct to turn off or turn on the main transceiver and/or the wake up receiver of the first network node after a specified time point, the specified time may be a time difference (a difference between time of turning on and current time), or may be specific time T1. In an implementation, if the preset frame carries a bit to instruct to turn off or turn on the main transceiver and/or the wake up receiver of the first network node within a specified time period, the specified time period may be (time T1 and time T2), or may be (a time difference 1 and a time difference 2).

In an optional implementation, the indication information is used to indicate the on/off states of the main transceiver of the first network node and the wake up receiver of the first network node immediately, after a specified time point, or within a specified time period.

That the first network node controls, based on the indication information, to switch an on/off state of the main transceiver and/or the wake up receiver of the first network node includes:

controlling, by the first network node based on the indication information, to switch the on/off state of at least one of the main transceiver and the wake up receiver.

In this embodiment of the present invention, immediate execution may include buffer duration for the main transceiver to wake up. The preset frame may be the wake up packet, or may be the 802.11 frame.

Figure 6:
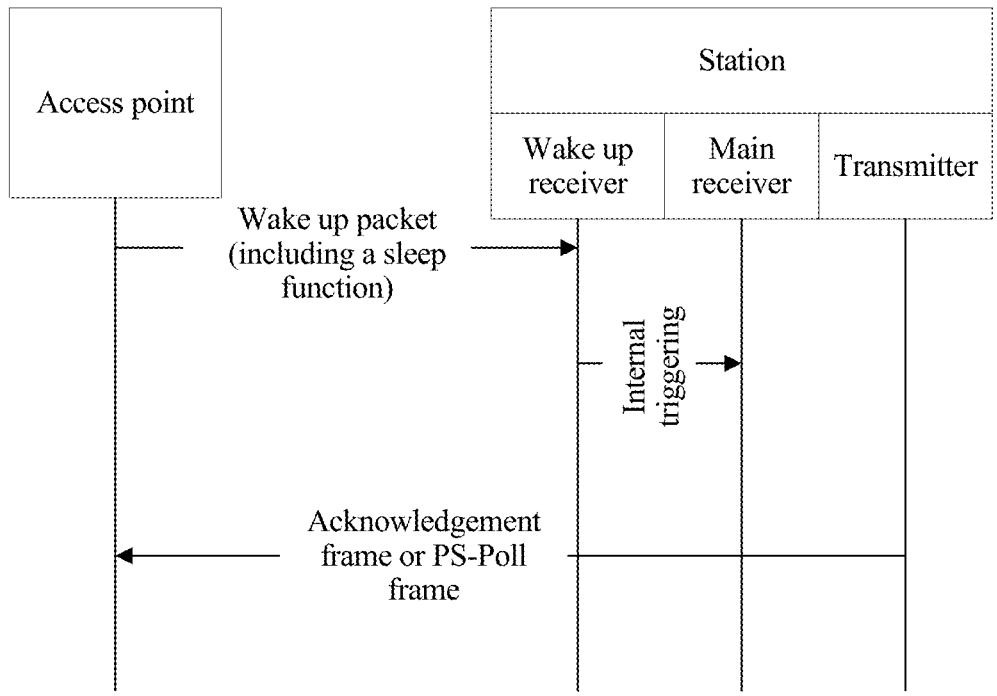
FIG. 6 is an interaction diagram of sending a wake up packet by an access point according to an embodiment of the present invention.

For example, the preset frame is the wake up packet. The main transceiver of the first network node is in an off state, and the second network node sends the wake up packet to the first network node. As shown in FIG. 6, the first network node is a station, and the second network node is an access point. The access point sends a wake up packet to the station. A wake up receiver of the station receives the wake up packet, and turns on a main transceiver of the station through internal triggering.

The wake up packet may be of a structure shown in FIG. 4a or FIG. 4b, but is not limited to this structure. The wake up packet includes a legacy preamble, a wake up packet preamble, a MAC header, a frame body, and an FCS (frame check sequence, frame check sequence). Generally, the MAC header carries a receiving address, a wake up type, and the like, and the frame body carries some control commands. In this embodiment, the indication information is located in a signaling field as a control command, or is encapsulated in the frame body, or the indication information is implied in the wake up type of the MAC header.

The indication information may include an indication bit, for example, the following indication bits, and the indication bit indicates the on/off state that the main transceiver and the wake up receiver need to switch immediately, after a specified time point, or within a specified time period.

| 00 | A wake up receiver is off, and a main receiver is off |
| 01 | The wake up receiver is off, and the main receiver is on |
| 10 | The wake up receiver is on, and the main receiver is off (or reserved, without meaning) |
| 11 | The wake up receiver is on, and the main receiver is on |

The foregoing indication bits may also be separated into two bits to respectively indicate on/off states of the main transceiver and the wake up receiver. The two bits are not limited to two bits, for example, may be two strings of special sequences.

Figure 7:
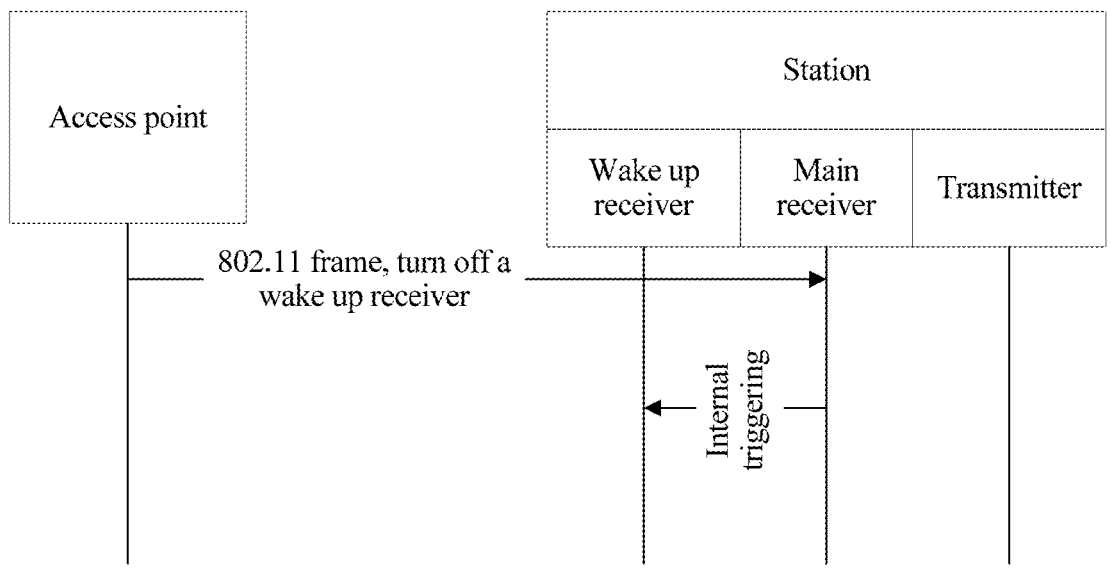
FIG. 7 is an interaction diagram of sending an 802.11 frame by an access point according to an embodiment of the present invention.

For example, the preset frame is the 802.11 frame. To be specific, the main transceiver of the first network node is in an on state, and the second network node (for example, the AP) sends the 802.11 frame to the first network node (for example, the station STA). As shown in FIG. 7, the access point sends the 802.11 frame to the station, and after receiving the 802.11 frame, the main receiver of the station turns off or turns on the wake up receiver based on indication information through internal triggering.

The 802.11 frame sent by the AP carries an indication bit, for example, the following indication bits, and the indication bit indicates a state that the main transceiver and the wake up receiver need to switch immediately, after a specified time point, or within a specified time period.

| | |
|---|---|
| 00 | A wake up receiver is off, and a main receiver is off |
| 01 | The wake up receiver is off, and the main receiver is on |
| 10 | The wake up receiver is on, and the main receiver is off |
| 11 | The wake up receiver is on, and the main receiver is on |

The foregoing indication bits may also be separated into two bits to respectively indicate states of the main transceiver and the wake up receiver. The two bits are not limited to two bits, for example, may be two strings of special sequences.

In another optional implementation, the indication information is used to indicate an off state of the wake up receiver of the first network node immediately, after a specified time point, or within a specified time period.

That the first network node controls, based on the indication information, to switch an on/off state of the main transceiver and/or the wake up receiver of the first network node includes:

turning off, by the first network node, the wake up receiver after a specified time point or within a specified time period based on the indication information.

In this embodiment of the present invention, the preset frame may be a wake up packet, and the wake up packet carries one bit or a wake up type to instruct the first network node to turn off the wake up receiver immediately, after a specified time point, or within a specified time period.

In another implementation, the preset frame may be an 802.11 frame, and the 802.11 frame may also carry one bit to instruct the first network node to turn off the wake up receiver immediately, after a specified time point, or within a specified time period.

In still another optional implementation, the preset frame is the wake up packet, and the indication information is used to indicate an on state of the main transceiver of the first network node immediately, after a specified time point, or within a specified time period.

That the first network node controls, based on the indication information, to switch an on/off state of the main transceiver and/or the wake up receiver of the first network node includes step 1 and step 2.

Step 1: The first network node turns on the main transceiver immediately, after the specified time point, or within the specified time period based on the indication information to perform data communication.

Step 2: The first network node controls to turn off the wake up receiver when a data communication status of the main transceiver meets a preset condition.

In this embodiment of the present invention, the preset frame is a wake up packet, and the wake up packet carries an instruction command to instruct the first network node to switch a state of the main transceiver of the first network node, including an on state or an off state. Then, some preset rules are specified to change a state of the wake up receiver of the first network node, so as to save energy.

Step 1: The second network node sends the wake up packet to the first network node, where the wake up packet carries a command to instruct the first network node to turn on the main transceiver.

Step 2: After receiving the wake up packet, the first network node turns on the main transceiver, and then directly turns off the wake up receiver or turns off the wake up receiver when a specific condition is met.

The condition may be that the first network node successfully exchanges data with the second network node after being woken up. An example is as follows:

1. After the first network node is woken up by the second network node, if the first network node wakes up immediately, the second network node estimates when the first network node wakes up (there is wake-up buffer duration). If the first network node wakes up after a specified time point, the second network node operates after the specified time point. The second network node sends data to the first network node, and the first network node returns an acknowledgement frame after correctly receiving the data. Optionally, after receiving the acknowledgement frame of the first network node, the second network node returns an acknowledgement frame again.

2. After the first network node is woken up, the first network node sends a control frame to notify the second network node that the main transceiver of the second network node is woken up. The control frame may be a PS-Poll frame, or may be an acknowledgement frame. After receiving the control frame, the second network node sends data or replies with an acknowledgement frame to the first network node. If receiving a data frame, the first network node returns an acknowledgement frame to the second network node.

In still another optional implementation, the preset frame is an 802.11 frame, and the indication information includes an identifier used to indicate that the second network node has no buffer data to be sent to the first network node. For example, the second network node is the AP, the first network node is the STA, and when a bit of "more data" of a "frame control" field (in a MAC header) in a data frame sent by the AP to the STA is 0, it indicates that the AP currently has no buffer data to be sent to the station.

That the first network node controls, based on the indication information, to switch an on/off state of the main transceiver and/or the wake up receiver of the first network node includes:

controlling, by the first network node based on the indication information, to turn off the main transceiver of the first network node and turn on the wake up receiver of the first network node.

That how the first network node autonomously changes, according to a specific rule, an on/off state of the wake up receiver of the first network node in a state in which the wake up receiver is off and the main transceiver is on is described in this embodiment of the present invention. Generally, when two network nodes perform data communication, a frame structure may have an identifier used to indicate whether there is buffer data. For example, when the first network node communicates with the second network node by using the main transceiver, the second network node transmits data to the first network node by using the preset frame. The preset frame includes an identifier used to indicate whether the second network node further has buffer data to be sent to the first network node.

If the second network node subsequently has no buffer data to be sent to the first network node, or if the second network node subsequently has no buffer data to be sent to the first network node, and learns that the first network node has no data to be sent to the second network node, the first network node needs to turn off the main transceiver based on an energy saving requirement. When the first network node turns off the main transceiver, the first network node needs to turn on the wake up receiver to avoid omitting data sent by the second network node to the first network node in the future.

In this embodiment of the present invention, the first network node receives the preset frame sent by the second network node. The preset frame includes the indication information used to indicate the on/off state of the main transceiver and/or the wake up receiver of the first network node immediately, after a specified time point, or within a specified time period. The first network node controls, based on the indication information, to switch the on/off state of the main transceiver and/or the wake up receiver of the first network node. Energy is saved by using the indication information in the preset frame to indicate the on/off state of the main transceiver and/or the wake up receiver of the first network node immediately, after a specified time point, or within a specified time period.

Figure 8:
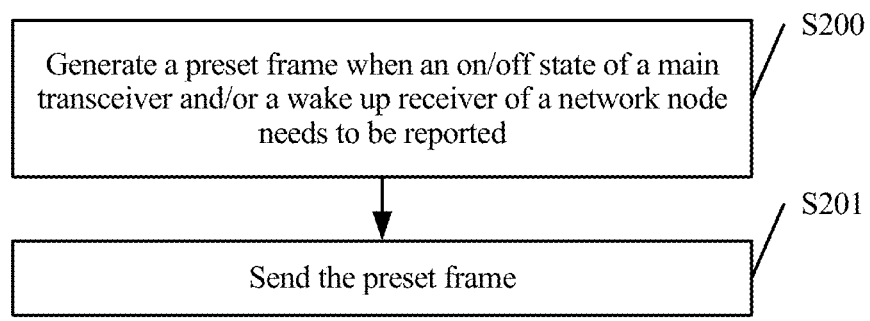
FIG. 8 is a schematic flowchart of another state switching method according to an embodiment of the present invention.

FIG. 8 is a schematic flowchart of another state switching method according to an embodiment of the present invention. As shown in the figure, the state switching method in this embodiment of the present invention includes the following steps:

S200. Generate a preset frame when an on/off state of a main transceiver and/or a wake up receiver of a network node needs to be reported, where the preset frame includes an on/off state of the main transceiver and/or the wake up receiver of the network node immediately, after a specified time point, or within a specified time period.

S201. Send the preset frame.

Optionally, the preset frame includes an 802.11 frame. The main transceiver of the network node sends the 802.11 frame.

Further, optionally, the generating a preset frame when an on/off state of a main transceiver and/or a wake up receiver of a network node needs to be reported includes:

generating the preset frame when the network node needs to switch the on/off state of the main transceiver and/or the wake up receiver; or generating the preset frame when the network node receives a request frame used to request the on/off state of the main transceiver and/or the wake up receiver of the network node.

Figure 9:
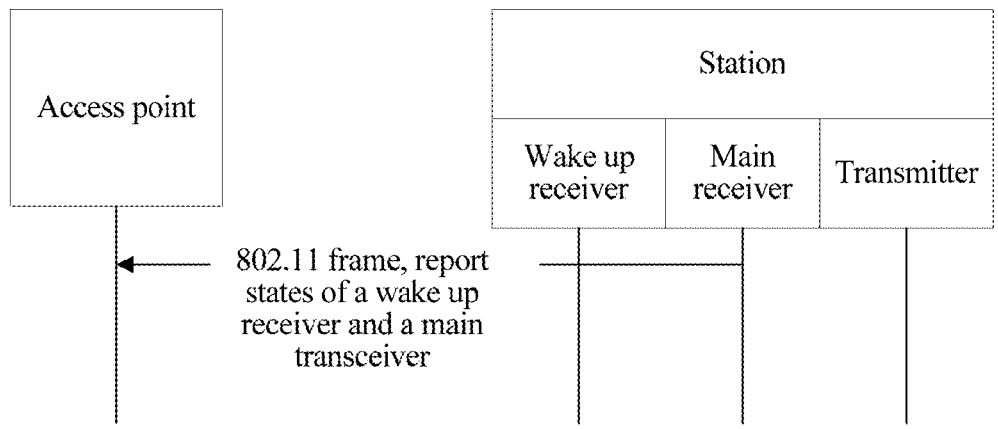
FIG. 9 is an interaction diagram of sending an 802.11 frame by a station according to an embodiment of the present invention.

In this embodiment of the present invention, the network node is an AP or a STA, and the network node is equipped with both a main transceiver and a wake up receiver. When the network node is in an energy-saving state, the network node actively turns off the main transceiver and/or the wake up receiver. Before turn-off, the network node actively sends an 802.11 frame to notify another network node of a to-be-changed state of the main transceiver and/or the wake up receiver of the network node. As shown in FIG. 9, an example in which the network node is a station STA is used for description herein. A main transceiver of the station actively sends the 802.11 frame to an access point to report a to-be-changed state of a wake up receiver and/or the main transceiver of the station. The 802.11 frame sent by the station reports a state of the station. The frame carries an indication bit, for example, the following indication bits, and the indication bit indicates a to-be-changed state of the main transceiver and/or the wake up receiver immediately or after a specified time point.

| | |
|---|---|
| 00 | A wake up receiver is off, and a main receiver is off |
| 01 | The wake up receiver is off, and the main receiver is on |
| 10 | The wake up receiver is on, and the main receiver is off |
| 11 | The wake up receiver is on, and the main receiver is on |

The foregoing indication bits may also be separated into two bits to respectively indicate states of the main transceiver and the wake up receiver. The two bits are not limited to two bits, for example, may be two strings of special sequences.

In another implementation, the another network node sends a state request frame to the network node, and after receiving the state request frame, the network node returns a state response frame. The state response frame carries the on/off state of the main transceiver and/or the wake up receiver of the network node.

In this embodiment of the present invention, when detecting that the on/off state of the main transceiver and/or the wake up receiver needs to be reported, the network node generates the preset frame, where the preset frame includes the on/off state of the main transceiver and/or the wake up receiver of the network node immediately, after a specified time point, or within a specified time period, and sends the preset frame. This active notification manner helps the another network node to learn the on/off state of the main transceiver and/or the wake up receiver of the network node, so as to determine a communication manner.

Figure 10:
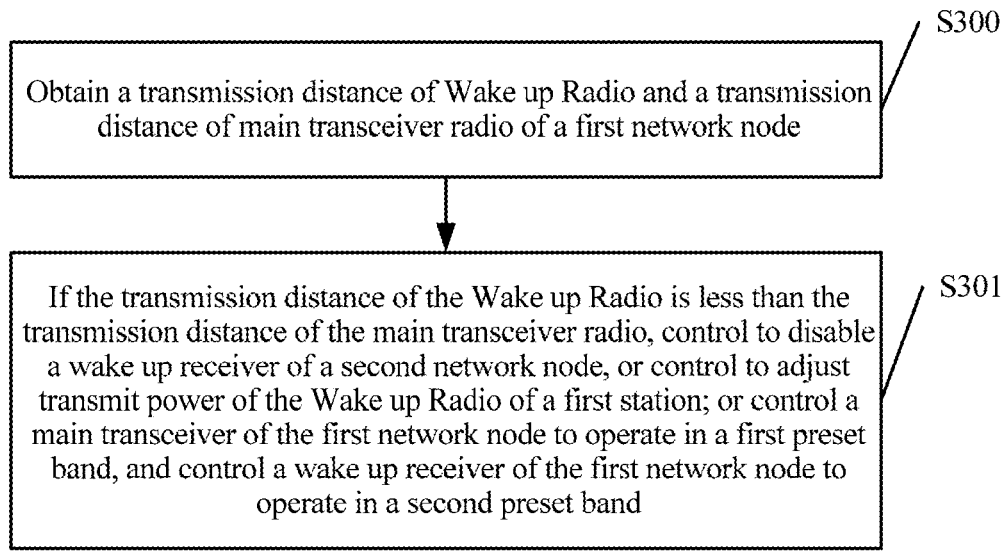
FIG. 10 is a schematic flowchart of a radio control method according to an embodiment of the present invention.

FIG. 10 is a schematic flowchart of a radio control method according to an embodiment of the present invention. As shown in the figure, the radio control method in this embodiment of the present invention includes the following steps.

S300. Obtain a transmission distance of Wake up Radio and a transmission distance of main transceiver radio of a second network node, where the transmission distance of the Wake up Radio is a farthest distance that can be reached by a wake up packet sent by the second network node to a first network node.

S301. If the transmission distance of the Wake up Radio is less than the transmission distance of the main transceiver radio, control to disable a wake up receiver of the first network node, or control to adjust transmit power of the Wake up Radio of the second network node; or control a main transceiver of the second network node to operate in a first preset band, and control a wake up receiver of the second network node to operate in a second preset band.

Optionally, the obtaining a transmission distance of Wake up Radio and a transmission distance of main transceiver radio of a second network node includes:

obtaining an operating band of the wake up receiver of the first network node and maximum transmit power of a main transceiver of the first network node; and calculating the transmission distance of the Wake up Radio and the transmission distance of the main transceiver radio of the second network node based on the operating band of the wake up receiver of the first network node, the maximum transmit power of the main transceiver of the first network node, maximum power of a wake up transmitter of the second network node, maximum power of the main transceiver of the second network node, and an operating band of the main transceiver of the second network node.

In this embodiment of the present invention, if the second network node is an AP, the first network node is a STA. If the second network node is a STA, the first network node is an AP. The first network node is equipped with a wake up receiver and a main transceiver. It is assumed that the wake up receiver and the main transceiver operate in a same band. In this case, a coverage area of the Wake up Radio of the second network node needs to be at least the same as a coverage area of the main transceiver radio. Based on this assumption, when the wake up receiver and the main transceiver do not operate in a same band, the coverage area of the Wake up Radio of the second network node may be less than the coverage area of the main transceiver radio of the second network node, for example, when the main transceiver operates in a 2.4 GHz band, the wake up receiver operates in a band of 5150-5250 MHz, 5250-5350 MHz, or 5470-5725 MHz. This is mainly caused by different Effective Isotropic Radiated Power (Effective Isotropic Radiated Power, EIRP) limits and different power spectrum density (PSD) limits of bands, and different channel loss of different bands (generally, channel loss of a high frequency band is more, and a transmission distance of signals with same power is relatively shorter on a high frequency band channel).

In an optional implementation, an example in which the second network node is an AP and the first network node is a STA is used for description. The AP and the STA send a plurality of frames to negotiate the transmission distances of the Wake up Radio and the main transceiver radio. When the AP learns that the coverage area of the Wake up Radio is less than the coverage area of the main transceiver radio of the AP, the AP sends a corresponding management frame to the STA, where the management frame carries an element that instructs the STA to disable the wake up receiver, or the AP adjusts the transmit power of the Wake up Radio, so that the coverage area of the Wake up Radio is the same as the coverage area of the main transceiver radio. In addition, the AP notifies the STA of maximum transmit power of the main transceiver radio and the Wake up Radio of the AP.

On the contrary, if the second network node is a STA and the first network node is an AP, when the STA learns that the coverage area of the Wake up Radio of the STA is less than the coverage area of the main transceiver radio of the STA, the STA needs to send a management frame to the AP, where the management frame carries an element that instructs the AP to disable the wake up receiver, or the STA adjusts the transmit power of the Wake up Radio, so that the coverage area of the Wake up Radio is the same as the coverage area of the main transceiver radio. In addition, the STA notifies the AP of maximum transmit power of the main transceiver radio and the Wake up Radio of the STA.

A specific negotiation process in which the second network node is an AP, and the first network node is a STA is described below.

1. The AP sends a request frame to enable the STA to report the band in which the wake up receiver operates and the maximum transmit power of the main transceiver.

2. The STA replies, based on the request frame, the band in which the wake up receiver of the STA operates and the maximum transmit power of the main transceiver. Alternatively, the first step is omitted, and the STA actively reports the band in which the wake up receiver of the STA operates, and the maximum transmit power of the main transceiver, for example, by carrying in an association request frame.

3. The AP calculates transmission distances of the Wake up Radio and the main transceiver radio of the AP by using the maximum transmit power of the wake up transmitter of the AP, maximum transmit power of a main transceiver transmitter of the AP, the band in which the main transceiver of the AP operates, and the maximum transmit power of the main transceiver of the STA, and the band in which the wake up receiver of the STA operates.

4. If the AP finds that the coverage area of the Wake up Radio is less than the coverage area of the main transceiver radio of the AP, the AP sends a corresponding management frame to instruct the STA to disable the wake up receiver of the STA, or adjusts the transmit power of the Wake up Radio of the AP, and notifies the STA of the maximum transmit power of the main transceiver radio and the Wake up Radio.

Alternatively,

1. The wake up receiver of the STA detects whether there is a wake up packet from a local BSS AP on a current channel in which the STA is located or an agreed channel.

2. If the STA does not detect the wake up packet from the local BSS AP within agreed time t1, the STA needs to spontaneously wake up the main transceiver of the STA, and initiates, through the main transceiver of the STA, a query to the AP about whether the wake up packet has been initiated; or reports to the AP that the STA disables the wake up receiver; or implements same distances by using an element that carries the maximum transmit power of the main transceiver radio and the Wake up Radio.

Alternatively,

1. If the AP still fails to wake up the STA (for example, does not receive an acknowledgement reply fed back by the STA) within time t2 after the AP sends one or more wake up packets to the STA, the AP no longer sends the wake up packet to the STA. Optionally, an 802.11 frame may be directly sent to the station.

A specific negotiation process in which the second network node is a STA, and the first network node is an AP is described below.

1. The AP broadcasts maximum transmit power of a wake up transmitter of the AP, maximum transmit power of a main transceiver transmitter of the AP, and several bands in which the wake up receiver of the AP can operate. The foregoing content may be carried by an element of a management frame.

2. After receiving the information, the STA selects the band in which the wake up receiver of the AP operates, and calculates transmission distances of the Wake up Radio and the main transceiver radio of the STA with reference to maximum transmit power of the main transceiver of the STA.

3. When the STA finds that the coverage area of the Wake up Radio of the STA is less than the coverage area of the main transceiver radio of the STA, the STA needs to instruct, by using the management frame, the AP to disable the wake up receiver, or adjusts the transmit power of the Wake up Radio of the STA, and notifies the AP of the maximum transmit power of the main transceiver radio and the Wake up Radio of the STA.

In another optional implementation, a band used by the wake up receiver and the main transceiver of the second network node (a wake up end) may be further limited, so as to avoid a case in which the coverage area of the Wake up Radio is less than the coverage area of the main transceiver radio. For a specific example, an EIRP limit and a PSD limit of each band in the United States are shown in the following table.

| Band | EIRP upper limit | PSD upper limit |
| --- | --- | --- |
| 2.4 GHz | (30 + 6) dBm | 8 dBm/3 kHz |

| Band | EIRP upper limit | PSD upper limit |
| --- | --- | --- |
| 5150-5250 MHz | (30 + 6) dBm | (17 + 6) dBm/MHz |
| 5250-5350 MHz | (24 + 6) dBm | (11 + 6) dBm/MHz |
| 5470-5725 MHz | (24 + 6) dBm | (11 + 6) dBm/MHz |
| 5725-5850 MHz | (30 + 6) dBm | (30 + 6) dBm/500 kHz |

In this case, in this embodiment of the present invention, an operating band of the wake up receiver of the second network node and an operating band of the main transceiver may be specified. It should be noted that the main transceiver may operate only in a 2.4 G band, or the main transceiver may operate only in a 5 G band, or the main transceiver may operate in both a 2.4 G band and a 5 G band.

When the main transceiver operates in the 2.4 G band, the wake up receiver also operates in the 2.4 G band.

Alternatively, when the main transceiver operates in the 2.4 G band, the wake up receiver operates in the 2.4 G band or a 5 G high frequency band (5725-5850 MHz).

Alternatively, when the main transceiver operates in 5150-5250 MHz, 5250-5350 MHz, 5470-5725 MHz, and 5725-5850 MHz, the wake up receiver operates in a 5 G high frequency band (5725-5850 MHz).

Alternatively, when the main transceiver operates in 5150-5250 MHz, 5250-5350 MHz, 5470-5725 MHz, and 5725-5850 MHz, the wake up receiver also operates in the 2.4 G band.

Alternatively, when the main transceiver operates in 5150-5250 MHz, 5250-5350 MHz, 5470-5725 MHz, and 5725-5850 MHz, the wake up receiver also operates in a corresponding band.

Alternatively, when the main transceiver operates in 5150-5250 MHz, 5250-5350 MHz, 5470-5725 MHz, and 5725-5850 MHz, the wake up receiver operates in a 5 G high frequency band (5725-5850 MHz) or the 2.4 G band.

Alternatively, when the main transceiver operates in 5150-5250 MHz, 5250-5350 MHz, 5470-5725 MHz, and 5725-5850 MHz, the wake up receiver also operates in a corresponding band or operates in the 2.4 G band.

Alternatively, when the main transceiver operates in 5150-5250 MHz, 5250-5350 MHz, 5470-5725 MHz, and 5725-5850 MHz, the wake up receiver also operates in a corresponding band or operates in a 5 G high frequency band (5725-5850 MHz).

Alternatively, when the main transceiver operates in 5150-5250 MHz, 5250-5350 MHz, 5470-5725 MHz, and 5725-5850 MHz, the wake up receiver operates in a corresponding band, a 5 G high frequency band (5725-5850 MHz), or the 2.4 G band.

Another specific example is a power limit in China.

| Band | EIRP upper limit | PSD upper limit |
| --- | --- | --- |
| 2.4 GHz | 20 dBm when an antenna gain <10 dBi 27 dBm when an antenna gain ≥10 dBi | 10 dBm/MHz when an antenna gain <10 dBi; 17 dBm/MHz when an antenna gain ≥10 dBi; |
| 5150-5350 MHz | 23 dBm | 10 dBm/MHz |
| 5725-5850 MHz | (27 + 6) dBm | (13 + 6) dBm/MHz |

In this case, in this embodiment of the present invention, an operating band of the wake up receiver of the second network node and an operating band of the main transceiver may be specified. It should be noted that the main transceiver may operate only in a 2.4 G band, or the main transceiver may operate only in a 5 G band, or the main transceiver may operate in both a 2.4 G band and a 5 G band.

When the main transceiver operates in the 2.4 G band, the wake up receiver also operates in the 2.4 G band.

Alternatively, when the main transceiver operates in the 2.4 G band, the wake up receiver operates in the 2.4 G band or a 5 G high frequency band (5725-5850 MHz).

Alternatively, when the main transceiver operates in the 5 G band (5150-5350 MHz and 5725-5850 MHz), the wake up receiver operates in a 5 G high frequency band (5725-5850 MHz).

Alternatively, when the main transceiver operates in 5150-5350 MHz and 5725-5850 MHz, the wake up receiver also operates in a corresponding band.

Alternatively, when the main transceiver operates in 5150-5350 MHz and 5725-5850 MHz, the wake up receiver operates in a corresponding band or operates in a 5 G high frequency band (5725-5850 MHz).

Alternatively, when the main transceiver operates in 5150-5350 MHz, the wake up receiver operates in the 2.4 G band.

Alternatively, when the main transceiver operates in 5150-5350 MHz, the wake up receiver operates in a corresponding band or the 2.4 G band.

Alternatively, when the main transceiver operates in 5150-5350 MHz, the wake up receiver operates in a 5 G high frequency band (5725-5850 MHz) or the 2.4 G band.

Alternatively, when the main transceiver operates in 5150-5350 MHz, the wake up receiver operates in a corresponding band, a 5 G high frequency band (5725-5850 MHz), or the 2.4 G band.

Alternatively, when the main transceiver operates in 5725-5850 MHz, the wake up receiver operates in a corresponding band.

In this embodiment of the present invention, the transmission distance of the Wake up Radio and the transmission distance of the main transceiver radio of the second network node are obtained, where the transmission distance of the Wake up Radio is the farthest distance that can be reached by the wake up packet sent by the second network node to the first network node. If the transmission distance of the Wake up Radio is less than the transmission distance of the main transceiver radio, disabling of the wake up receiver of the first network node is controlled, or adjustment of the transmit power of the Wake up Radio of the second network node is controlled; or the main transceiver of the second network node is controlled to operate in the first preset band, and the wake up receiver of the second network node is controlled to operate in the second preset band. Accurate reception of the wake up packet between the first network node and the second network node can be ensured in the foregoing manner.

Figure 11:
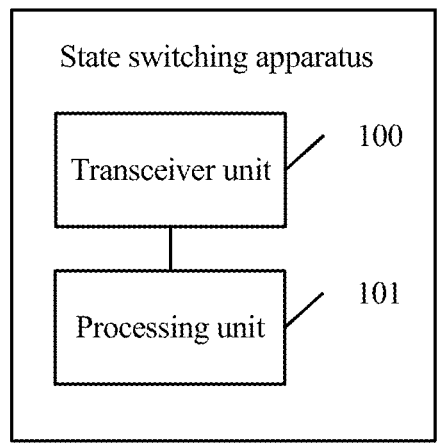
FIG. 11 is a schematic structural diagram of a state switching apparatus according to an embodiment of the present invention.

FIG. 11 is a schematic structural diagram of a state switching apparatus according to an embodiment of the present invention. The state switching apparatus may be applied to a first network node. As shown in FIG. 11, the state switching apparatus in this embodiment includes a transceiver unit 100 and a processing unit 101.

The transceiver unit 100 is configured to receive a preset frame sent by a second network node, where the preset frame includes indication information used to indicate an on/off state of a main transceiver and/or a wake up receiver of the first network node immediately, after a specified time point, or within a specified time period.

The processing unit 101 is configured to control, based on the indication information, to switch an on/off state of the main transceiver and/or the wake up receiver of the first network node.

Optionally, the preset frame includes an 802.11 frame or a wake up packet, the main transceiver of the first network node receives the 802.11 frame, and the wake up receiver of the first network node receives the wake up packet.

In an optional implementation, the indication information is used to indicate on/off states of the main transceiver of the first network node and the wake up receiver of the first network node immediately, after a specified time point, or within a specified time period.

That the processing unit 101 controls, based on the indication information, to switch an on/off state of the main transceiver and/or the wake up receiver of the first network node specifically includes:

controlling, based on the indication information, to switch an on/off state of at least one of the main transceiver and the wake up receiver.

In another optional implementation, the indication information is used to indicate an off state of the wake up receiver of the first network node immediately, after a specified time point, or within a specified time period.

That the processing unit 101 controls, based on the indication information, to switch an on/off state of the main transceiver and/or the wake up receiver of the first network node specifically includes:

turning off the wake up receiver after a specified time point or within a specified time period based on the indication information.

In still another optional implementation, the preset frame is the wake up packet, and the indication information is used to indicate an on state of the main transceiver of the first network node immediately, after a specified time point, or within a specified time period.

That the processing unit 101 controls, based on the indication information, to switch an on/off state of the main transceiver and/or the wake up receiver of the first network node specifically includes:

turning on the main transceiver immediately, after the specified time point, or within the specified time period based on the indication information to perform data communication; and controlling, by the first network node, to turn off the wake up receiver when a data communication status of the main transceiver meets a preset condition.

In still another optional implementation, the preset frame is the 802.11 frame, and the indication information includes an identifier used to indicate that the second network node has no buffer data to be sent to the first network node.

That the processing unit 101 controls, based on the indication information, to switch an on/off state of the main transceiver and/or the wake up receiver of the first network node specifically includes:

controlling, based on the indication information, to turn off the main transceiver of the first network node and turn on the wake up receiver of the first network node.

In this embodiment of the present invention, the first network node receives the preset frame sent by the second network node. The preset frame includes the indication information used to indicate the on/off state of the main transceiver and/or the wake up receiver of the first network node immediately, after a specified time point, or within a specified time period. The first network node controls, based on the indication information, to switch the on/off state of the main transceiver and/or the wake up receiver of the first network node. Energy is saved by using the indication information in the preset frame to indicate the on/off state of the main transceiver and/or the wake up receiver of the first network node immediately, after a specified time point, or within a specified time period.

Figure 12:
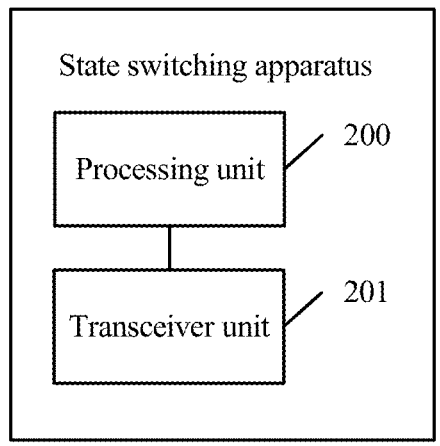
FIG. 12 is a schematic structural diagram of another state switching apparatus according to an embodiment of the present invention.

FIG. 12 is a schematic structural diagram of another state switching apparatus according to an embodiment of the present invention. The state switching apparatus may be applied to a network node. The network node may be an AP or a STA. As shown in FIG. 12, the state switching apparatus in this embodiment includes a processing unit 200 and a transceiver unit 201.

The processing unit 200 is configured to generate a preset frame when detecting that an on/off state of a main transceiver and/or a wake up receiver of a network node needs to be reported, where the preset frame includes an on/off state of the main transceiver and/or the wake up receiver of the network node immediately, after a specified time point, or within a specified time period.

The transceiver unit 201 is configured to send the preset frame.

Optionally, the preset frame includes an 802.11 frame. The main transceiver of the network node sends the 802.11 frame.

Further, optionally, that the processing unit 200 generates the preset frame when the on/off state of the main transceiver and/or the wake up receiver of the network node needs to be reported specifically includes:

generating the preset frame when the network node needs to switch the on/off state of the main transceiver and/or the wake up receiver; or generating the preset frame when the network node receives a request frame used to request the on/off state of the main transceiver and/or the wake up receiver of the network node.

In this embodiment of the present invention, when detecting that the on/off state of the main transceiver and/or the wake up receiver needs to be reported, the network node generates the preset frame, where the preset frame includes the on/off state of the main transceiver and/or the wake up receiver of the network node immediately, after a specified time point, or within a specified time period, and sends the preset frame. This active notification manner helps another network node to learn the on/off state of the main transceiver and/or the wake up receiver of the network node, so as to determine a communication manner.

Figure 13:
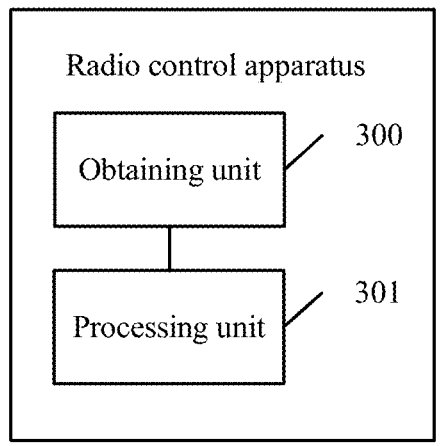
FIG. 13 is a schematic structural diagram of a radio control apparatus according to an embodiment of the present invention.

FIG. 13 is a schematic structural diagram of a radio control apparatus according to an embodiment of the present invention. The radio control apparatus in this embodiment of the present invention is applied to a second network node. A first network node is a waken-up end, and the second network node is a wake up end. As shown in the figure, the radio control apparatus in this embodiment of the present invention includes an obtaining unit 300 and a processing unit 301.

The obtaining unit 300 is configured to obtain a transmission distance of Wake up Radio and a transmission distance of main transceiver radio of the second network node, where the transmission distance of the Wake up Radio is a farthest distance that can be reached by a wake up packet sent by the second network node to the first network node.

The processing unit 301 is configured to: if the transmission distance of the Wake up Radio is less than the transmission distance of the main transceiver radio, control to disable a wake up receiver of the first network node, or control to adjust transmit power of the Wake up Radio of the second network node; or control a main transceiver of the second network node to operate in a first preset band, and control a wake up receiver of the second network node to operate in a second preset band.

Optionally, that the obtaining unit 300 obtains the transmission distance of the Wake up Radio and the transmission distance of the main transceiver radio of the second network node specifically includes:

obtaining an operating band of the wake up receiver of the first network node and maximum transmit power of a main transceiver of the first network node; and calculating the transmission distance of the Wake up Radio and the transmission distance of the main transceiver radio of the second network node based on the operating band of the wake up receiver of the first network node, the maximum transmit power of the main transceiver of the first network node, maximum power of a wake up transmitter of the second network node, maximum transmit power of the main transceiver of the second network node, and an operating band of the main transceiver of the second network node.

In this embodiment of the present invention, the transmission distance of the Wake up Radio and the transmission distance of the main transceiver radio of the second network node are obtained, where the transmission distance of the Wake up Radio is the farthest distance that can be reached by the wake up packet sent by the second network node to the first network node. If the transmission distance of the Wake up Radio is less than the transmission distance of the main transceiver radio, disabling of the wake up receiver of the first network node is controlled, or adjustment of the transmit power of the Wake up Radio of the second network node is controlled; or the main transceiver of the second network node is controlled to operate in the first preset band, and the wake up receiver of the second network node is controlled to operate in the second preset band. Accurate reception of the wake up packet between the first network node and the second network node can be ensured in the foregoing manner.

Figure 14:
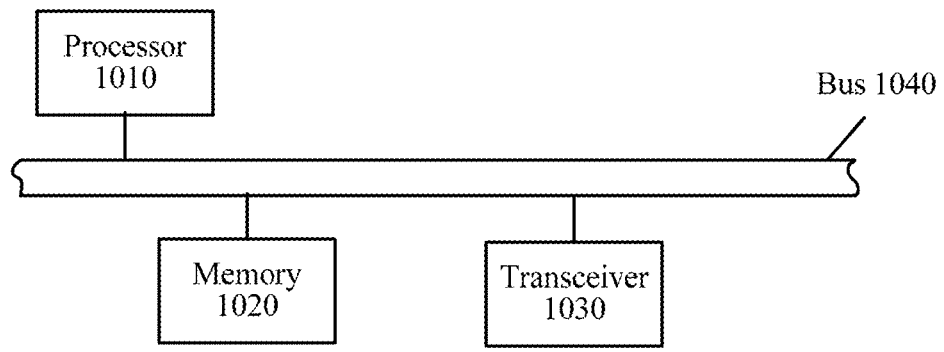
FIG. 14 is a schematic structural diagram of still another state switching apparatus according to an embodiment of the present invention.

FIG. 14 is a schematic structural diagram of still another state switching apparatus according to an embodiment of the present invention. The state switching apparatus may be applied to a first network node. The state switching apparatus 1000 includes a processor 1010, a memory 1020, and a transceiver 1030. The first network node to which the state switching apparatus is applied may be any STA or AP shown in FIG. 1.

Specifically, the processor 1010 controls operations of the state switching apparatus 1000. The memory 1020 may include a read-only memory and a random access memory, and provides an instruction and data for the processor 1010. The processor may be a general purpose processor, a digital signal processor, an application-specific integrated circuit, a field programmable gate array, or another programmable logic device. A part of the memory 1020 may also include a non-volatile random access memory (NVRAM). All components of the state switching apparatus 1000 are coupled together by using a bus 1040. In addition to a data bus, the bus system 1040 further includes a power bus, a control bus, and a status signal bus. However, for clarity of description, various buses are marked as the bus system 1040 in the figure. It should be noted that the foregoing description of the structure of the state switching apparatus may be applied to a subsequent embodiment.

The transceiver 1030 is configured to receive a preset frame sent by a second network node, where the preset frame includes indication information used to indicate an on/off state of a main transceiver and/or a wake up receiver of the first network node immediately, after a specified time point, or within a specified time period.

The processor 1010 is configured to control, based on the indication information, to switch an on/off state of the main transceiver and/or the wake up receiver of the first network node.

Optionally, the preset frame includes an 802.11 frame or a wake up packet, the main transceiver of the first network node receives the 802.11 frame, and the wake up receiver of the first network node receives the wake up packet.

In an optional implementation, the indication information is used to indicate the on/off states of the main transceiver of the first network node and the wake up receiver of the first network node immediately, after a specified time point, or within a specified time period.

That the processor 1010 controls, based on the indication information, to switch an on/off state of the main transceiver and/or the wake up receiver of the first network node specifically includes:

controlling, based on the indication information, to switch an on/off state of at least one of the main transceiver and the wake up receiver.

In another optional implementation, the indication information is used to indicate an off state of the wake up receiver of the first network node immediately, after a specified time point, or within a specified time period.

That the processor 1010 controls, based on the indication information, to switch an on/off state of the main transceiver and/or the wake up receiver of the first network node specifically includes:

turning off the wake up receiver after a specified time point or within a specified time period based on the indication information.

In still another optional implementation, the preset frame is the wake up packet, and the indication information is used to indicate an on state of the main transceiver of the first network node immediately, after a specified time point, or within a specified time period.

That the processor 1010 controls, based on the indication information, to switch the on/off state of the main transceiver and/or the wake up receiver of the first network node specifically includes:

turning on the main transceiver after a specified time point or within a specified time period based on the indication information to perform data communication; and controlling, by the first network node, to turn off the wake up receiver when a data communication status of the main transceiver meets a preset condition.

In still another optional implementation, the preset frame is the 802.11 frame, and the indication information includes an identifier used to indicate that the second network node has no buffer data to be sent to the first network node.

That the processor 1010 controls, based on the indication information, to switch an on/off state of the main transceiver and/or the wake up receiver of the first network node specifically includes:

controlling, based on the indication information, to turn off the main transceiver of the first network node and turn on the wake up receiver of the first network node.

In this embodiment of the present invention, the first network node receives the preset frame sent by the second network node. The preset frame includes the indication information used to indicate the on/off state of the main transceiver and/or the wake up receiver of the first network node immediately, after a specified time point, or within a specified time period. The first network node controls, based on the indication information, to switch the on/off state of the main transceiver and/or the wake up receiver of the first network node. Energy is saved by using the indication information in the preset frame to indicate the on/off state of the main transceiver and/or the wake up receiver of the first network node immediately, after a specified time point, or within a specified time period.

It may be understood that, for specific implementations of the components in the foregoing state switching apparatus, further refer to related descriptions in the method embodiment in FIG. 5.

Figure 15:
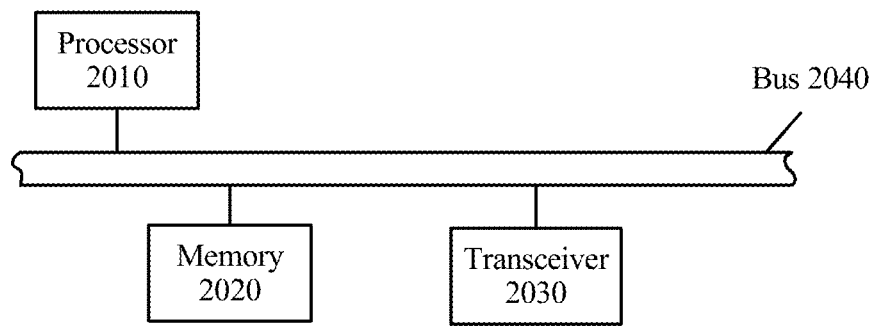
FIG. 15 is a schematic structural diagram of still another state switching apparatus according to an embodiment of the present invention.

FIG. 15 is a schematic structural diagram of still another state switching apparatus according to an embodiment of the present invention. The state switching apparatus may be applied to a network node. The network node may include an AP or a STA. The state switching apparatus 2000 includes a processor 2010, a memory 2020, and a transceiver 2030. The network node to which the state switching apparatus is applied may be the STA or AP shown in FIG. 1.

Specifically, the processor 2010 controls operations of the state switching apparatus 2000. The memory 2020 may include a read-only memory and a random access memory, and provides an instruction and data for the processor 2010. The processor may be a general purpose processor, a digital signal processor, an application-specific integrated circuit, a field programmable gate array, or another programmable logic device. A part of the memory 2020 may also include a non-volatile random access memory (NVRAM). All components of the state switching apparatus 2000 are coupled together by using a bus 2040. In addition to a data bus, the bus system 2040 further includes a power bus, a control bus, and a status signal bus. However, for clarity of description, various buses are marked as the bus system 2040 in the figure. It should be noted that the foregoing description of the structure of the state switching apparatus may be applied to a subsequent embodiment.

The processor 2010 is configured to generate a preset frame when an on/off state of a main transceiver and/or a wake up receiver of a network node needs to be reported, where the preset frame includes an on/off state of the main transceiver and/or the wake up receiver of the network node immediately, after a specified time point, or within a specified time period.

The transceiver 2030 is configured to send the preset frame.

Optionally, the preset frame includes an 802.11 frame. The main transceiver of the network node sends the 802.11 frame.

Further, optionally, that the processor 2010 generates the preset frame when the on/off state of the main transceiver and/or the wake up receiver of the network node needs to be reported specifically includes:

generating the preset frame when the network node needs to switch the on/off state of the main transceiver and/or the wake up receiver; or generating the preset frame when the network node receives a request frame used to request the on/off state of the main transceiver and/or the wake up receiver of the network node.

In this embodiment of the present invention, when detecting that the on/off state of the main transceiver and/or the wake up receiver needs to be reported, the network node generates the preset frame, where the preset frame includes the on/off state of the main transceiver and/or the wake up receiver of the network node immediately, after a specified time point, or within a specified time period, and sends the preset frame. This active notification manner helps another network node to learn the on/off state of the main transceiver and/or the wake up receiver of the network node, so as to determine a communication manner.

It may be understood that, for specific implementations of the components in the foregoing state switching apparatus, further refer to related descriptions in the method embodiment in FIG. 8.

Figure 16:
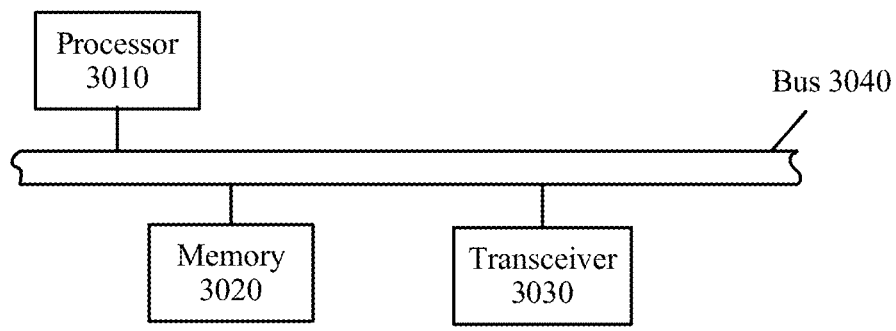
FIG. 16 is a schematic structural diagram of another radio control apparatus according to an embodiment of the present invention.

FIG. 16 is a schematic structural diagram of another radio control apparatus according to an embodiment of the present invention. The radio control apparatus may be applied to a second network node. The radio control apparatus 3000 includes a processor 3010, a memory 3020, and a transceiver 3030. The second network node to which the radio control apparatus is applied may be the STA or AP shown in FIG. 1.

Specifically, the processor 3010 controls operations of the radio control apparatus 3000. The memory 3020 may include a read-only memory and a random access memory, and provides an instruction and data for the processor 3010. The processor may be a general purpose processor, a digital signal processor, an application-specific integrated circuit, a field programmable gate array, or another programmable logic device. A part of the memory 3020 may also include a non-volatile random access memory (NVRAM). All components of the radio control apparatus 3000 are coupled together by using a bus 3040. In addition to a data bus, the bus system 3040 further includes a power bus, a control bus, and a status signal bus. However, for clarity of description, various buses are marked as the bus system 3040 in the figure. It should be noted that the foregoing description of the structure of the radio control apparatus may be applied to a subsequent embodiment.

The processor 3010 is configured to obtain a transmission distance of Wake up Radio and a transmission distance of main transceiver radio of the second network node, where the transmission distance of the Wake up Radio is a farthest distance that can be reached by a wake up packet sent by the second network node to a first network node.

The processor 3010 is further configured to: if the transmission distance of the Wake up Radio is less than the transmission distance of the main transceiver radio, control to disable a wake up receiver of the first network node, or control to adjust transmit power of the Wake up Radio of the second network node; or control a main transceiver of the second network node to operate in a first preset band, and control a wake up receiver of the second network node to operate in a second preset band.

Optionally, that the processor 3010 obtains the transmission distance of the Wake up Radio and the transmission distance of the main transceiver radio of the second network node specifically includes:

obtaining an operating band of the wake up receiver of the first network node and maximum transmit power of a main transceiver of the first network node; and calculating the transmission distance of the Wake up Radio and the transmission distance of the main transceiver radio of the second network node based on the operating band of the wake up receiver of the first network node, the maximum transmit power of the main transceiver of the first network node, maximum power of a wake up transmitter of the second network node, maximum transmit power of the main transceiver of the second network node, and an operating band of the main transceiver of the second network node.

In this embodiment of the present invention, the transmission distance of the Wake up Radio and the transmission distance of the main transceiver radio of the second network node are obtained, where the transmission distance of the Wake up Radio is the farthest distance that can be reached by the wake up packet sent by the second network node to the first network node. If the transmission distance of the Wake up Radio is less than the transmission distance of the main transceiver radio, disabling of the wake up receiver of the first network node is controlled, or adjustment of the transmit power of the Wake up Radio of the second network node is controlled; or the main transceiver of the second network node is controlled to operate in the first preset band, and the wake up receiver of the second network node is controlled to operate in the second preset band. Accurate reception of the wake up packet between the first network node and the second network node can be ensured in the foregoing manner.

It may be understood that, for specific implementations of the components in the foregoing radio control apparatus, further refer to related descriptions in the method embodiment in FIG. 10.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A state switching method, comprising:
   receiving, by a first network node, a preset frame from a second network node, wherein the preset frame comprises indication information indicating to switch ON a main transceiver of the first network node at a specified future time, after a specified time point, or within a specified time period; and
   controlling, by the first network node, based on the indication information, to switch ON the main transceiver of the first network node at the specified future time, after the specified time point or within the specified time period, to perform data communication,
   wherein the indication information is encapsulated in a frame body of the preset frame.

2. The method according to claim 1, wherein after controlling, based on the indication information, to switch ON the main transceiver of the first network node to perform data communication, the method further comprising:
   controlling, by the first network node, to switch off a wake up receiver when the data communication performed by the main transceiver meets a preset condition, wherein the preset condition is that the main transceiver successfully exchanges data with the second network node, wherein the wake up receiver is configured to wake up the main receiver.

3. The method according to claim 2, wherein the main transceiver successfully exchanges data with the second network node, comprising:
   the second network node sends data to the first network node, and the first network node returns an acknowledgement frame after correctly receiving the data; or
   the first network node sends a control frame to notify the second network node that the main transceiver of the first network node is woken up.

4. The method according to claim 1, wherein the indication information is located in a signaling field which is encapsulated a frame body of the preset frame.

5. The method according to claim 1, wherein the indication information is implied in a wake up type of a media access control (MAC) header.

6. The method according to claim 1, wherein the preset frame comprises a wake up packet.

7. The state switching method of claim 1 wherein the indication information comprises a wake up indicator encapsulated in a frame body of the preset frame.

8. A state switching method, comprising:
   generating, by a second network node, a preset frame the preset frame comprising indication information indicating to switch ON a main transceiver of a first network node at a specified future time, after a specified time point, or within a specified time period; and
   sending, by the second network node, the preset frame to the first network node,
   wherein the indication information is encapsulated in a frame body of the preset frame.

9. The method according to claim 8, wherein the indication information is located in a signaling field which is encapsulated in a frame body of the preset frame.

10. The method according to claim 8, wherein the indication information is encoded in a wake up type of the media access control (MAC) header.

11. The method according to claim 8, wherein the preset frame comprises a wake up packet.

12. The state switching method of claim 8 wherein the indication information comprises a wake up indicator encapsulated in a frame body of the preset frame.

13. A first network node, comprising a processor and a transceiver, the processor and the transceiver each configured to communicate with one another through a connection internal to the first network node, wherein:
   the transceiver is further configured to receive a preset frame from a second network node, wherein the preset frame comprises indication information indicating to switch ON a main transceiver of the first network node at a specified future time, after a specified time point, or within a specified time period; and
   the processor is further configured to control, based on the indication information, to switch ON the main transceiver of the first network node at the specified future time, after the specified time period, or within the specified time period, to perform data communication.

14. The first network node according to claim 13, wherein the processor is further configured to control to switch off a wake up receiver when the data communication performed by the main transceiver meets a preset condition, wherein the preset condition is that the main transceiver successfully exchanges data with the second network node, wherein the wake up receiver is configured to wake up the main receiver.

15. The first network node according to claim 14, wherein the main transceiver successfully exchanges data with the second network node, comprising:
   the second network node sends data to the first network node, and the first network node returns an acknowledgement frame after correctly receiving the data; or
   the first network node sends a control frame to notify the second network node that the main transceiver of the first network node is woken up.

16. The first network node according to claim 13, wherein the indication information is located in a signaling field which is encapsulated a frame body of the preset frame.

17. The first network node according to claim 13, wherein the indication information is encoded in a wake up type of a media access control (MAC) header.

18. The first network node according to claim 13, wherein the preset frame comprises a wake up packet.

19. The first network node of claim 13 wherein the indication information comprises a wake up indicator encapsulated in a frame body of the preset frame.

* * * * *